United States Patent [19]

Baxter

[11] Patent Number: 4,838,578
[45] Date of Patent: Jun. 13, 1989

[54] SLIDER

[75] Inventor: Bobby G. Baxter, Warrenton, Mo.

[73] Assignee: The Binkley Company, Warrenton, Mo.

[21] Appl. No.: 127,422

[22] Filed: Dec. 1, 1987

[51] Int. Cl.⁴ .............................................. B62D 53/06
[52] U.S. Cl. .................................... 280/149.2; 74/503
[58] Field of Search ........... 280/80 B; 74/470, 501 R, 74/501.5

[56] References Cited

U.S. PATENT DOCUMENTS

| | | | |
|---|---|---|---|
| 2,417,504 | 3/1947 | Knaggs et al. | 74/501.5 |
| 2,668,455 | 2/1954 | Herrmann | 74/501 R |
| 3,087,741 | 4/1963 | DeLay | 280/80 B |
| 3,146,000 | 8/1964 | Holzman | 280/80 B |
| 3,372,946 | 3/1968 | Hutchens | 280/80 B |
| 3,778,079 | 12/1973 | Vornberger et al. | 280/80 B |

Primary Examiner—Charles A. Marmor
Assistant Examiner—Ross Weaver
Attorney, Agent, or Firm—Senniger, Powers, Leavitt and Roedel

[57] ABSTRACT

The invention is directed to an improved slider providing adjustment of the suspension of a vehicle longitudinally with respect to the body of the vehicle. The slider is of the type comprising a pair of side rails secured at the left and right sides of the body in fixed position extending longitudinally of the body, and a frame carrying the suspension comprising left and right slide members slidable longitudinally of the body on the side rails, and a plurality of locking pins for locking the frame in various positions of adjustment relative to the side rails, the locking pins being retractible for permitting adjustment of the frame to a selected position of adjustment and extensible for locking the frame in a selected position of adjustment. The improvement comprises a mechanism for retracting the locking pins comprising linkage interconnecting the locking pins for conjoint movement of the pins between extended and retracted positions, an actuating member manually movable from a first position to a second position for effecting articulation of the linkage to retract the locking pins, and a spring associated with the actuating member adapted to deflect in the event one or more of the locking pins are stuck in extended position thereby to permit movement of the actuating member from its first position to its second position while urging articulation of the linkage to retract the locking pins. The actuating member may be secured in its second position while the spring is deflected thereby to maintain a force urging the locking pins toward a retracted position.

9 Claims, 5 Drawing Sheets

SLIDER

BACKGROUND OF THE INVENTION

This invention relates generally to sliders for adjustment of the suspension of a vehicle longitudinally with respect to the body of the vehicle and, more particularly, to apparatus for facilitating such ajustment.

This invention is especially concerned with sliders which enable adjustment of the suspension of a tandem axle trailer longitudinally relative to the van of the trailer. Conventional sliders used for this purpose typically comprise a pair of side rails secured at the left and right sides of the van in fixed position extending longitudinally of the van, and a frame which carries the suspension comprising left and right slide members slidable longitudinally of the van on the side rails. A plurality of locking pins lock the frame in various positions of adjustment relative to the side rails, the locking pins being retractible for permitting adjustment of the frame to a selected postion of adjustment and extensible for locking the frame in the selected position of adjustment. The locking pins are connected for conjoint movement between extended and retracted positions by linkage, and the pins are normally urged to their extended position by a plurality of springs. The linkage is operable to retract the pins by a pull rod extending laterally outwardly at one side of the slider frame.

While the pull rod design described above has been used for years, it has a serious drawback. This is due to the fact that the locking pins often become stuck in extended position (due to the pins becoming wedged in openings in the slider frame, for example), thus making it difficult if not impossible to operate the pull rod to retract the pins. In this event, the operator of the vehicle typically tries to jog the trailer (drive it forward and/or rearward in short spurts) until the pins are sufficiently freed to enable the pull rod to be operated. This is inconvenient and time consuming, especially if there is only one person operating the vehicle, since there is no indication while jogging the trailer as to when the pins are in fact free. Thus, after jogging the trailer the operator may find that the pins are still stuck, necessitating that the entire procedure be repeated. One solution to this problem is to have a second person pull on the pull rod while the trailer is being jogged, so that the pins will retract as soon as they become free. However, a second person is not always available. And even if a second person is available, grasping and pulling the handle while the vehicle is moving poses a risk of injury.

SUMMARY OF THE INVENTION

Among the several objects of this invention may be noted the provision of improved apparatus for retracting the locking pins of a slider to permit adjustment of the suspension of a vehicle longitudinally of the body of the vehicle; the provision of such apparatus which serves as the "second person" discussed above without actually requiring the use of a second person; the provision of such apparatus which is safe to operate; and the provision of such apparatus which is economical to manufacture. Other objects and features will be in part apparent and in part pointed out hereinafter.

Briefly, the present invention is an improvement on the slider of the type mentioned above in having means for retracting the locking pins comprising linkage interconnecting the locking pins for conjoint movement of the pins between extended and retracted positions, an actuating member manually movable from a first position to a second position for effecting articulation of the linkage to retract the locking pins, spring means associated with said actuating member adapted to deflect for permitting movement of the actuating member from said first position to said second position in the event one or more of the locking pins are stuck in extended position while urging articulation of said linkage to retract said locking pins, and means for securing said actuating member in said second position while said spring means is deflected thereby to maintain a force urging the locking pins toward said retracted position.

BRIEF DESCRIPTION OF THE DRAWINGS

FIG. 4 is an enlarged portion of FIG. 1 with portions broken away to illustrate details;

Corresponding reference numerals indicate corresponding parts throughout the several views of the drawings.

DESCRIPTION OF THE PREFERRED EMBODIMENT

Figure 1:
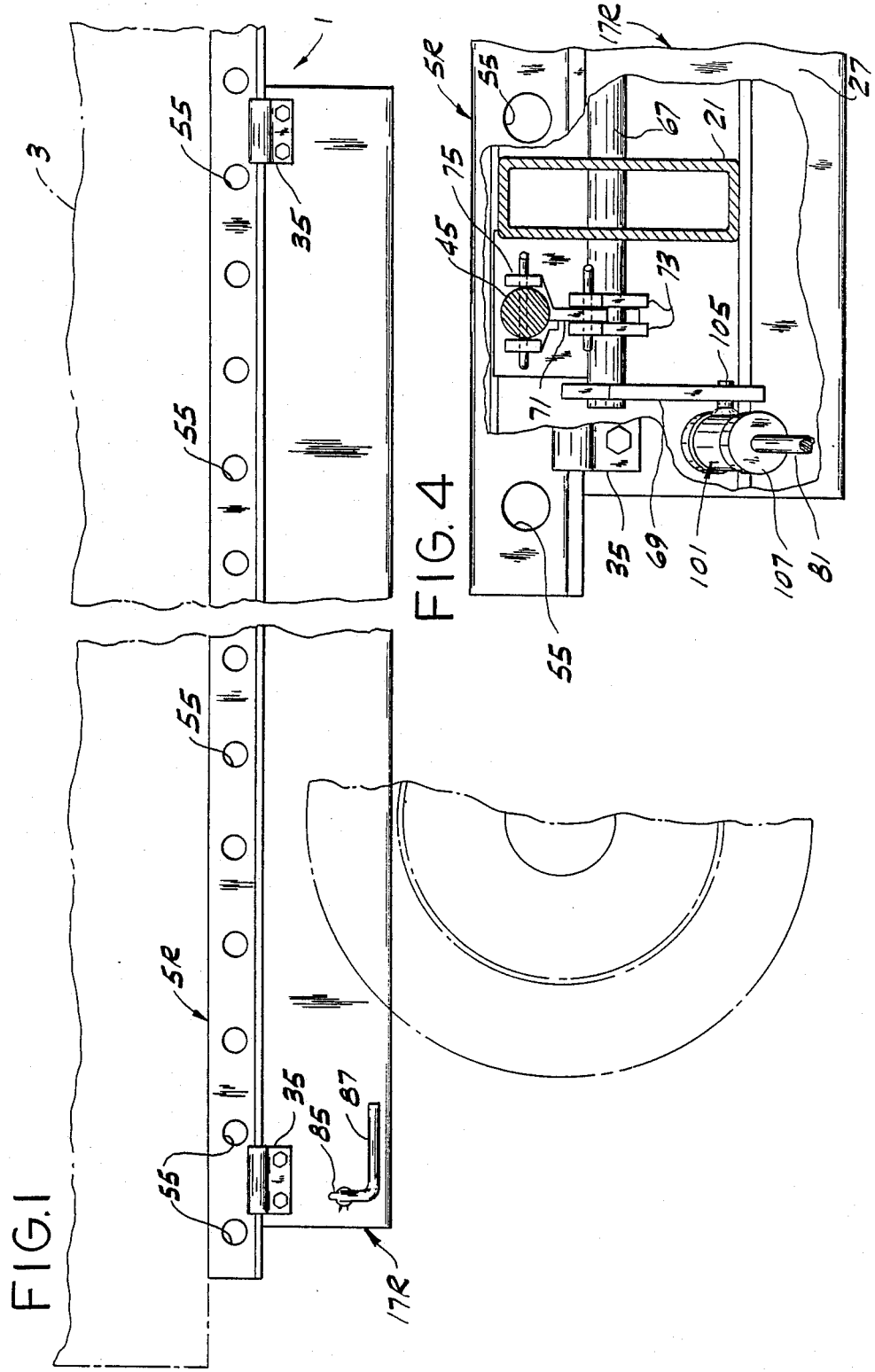
FIG. 1 is a side elevation of a vehicle incorporating a slider of this invention.

Referring now to FIG. 1 of the drawings, a slider with the improvement of the present invention is indicated in its entirety by the reference numeral 1 and is shown mounted on the body 3 of a vehicle. The slider 1 permits adjustment of the suspension (not shown) of the vehicle longitudinally with respect to the body 3. As illustrated, the vehicle is a trailer in which the body 3 is a van, but it will be understood that the slider of this invention is not limited to trailers.

Figure 3:
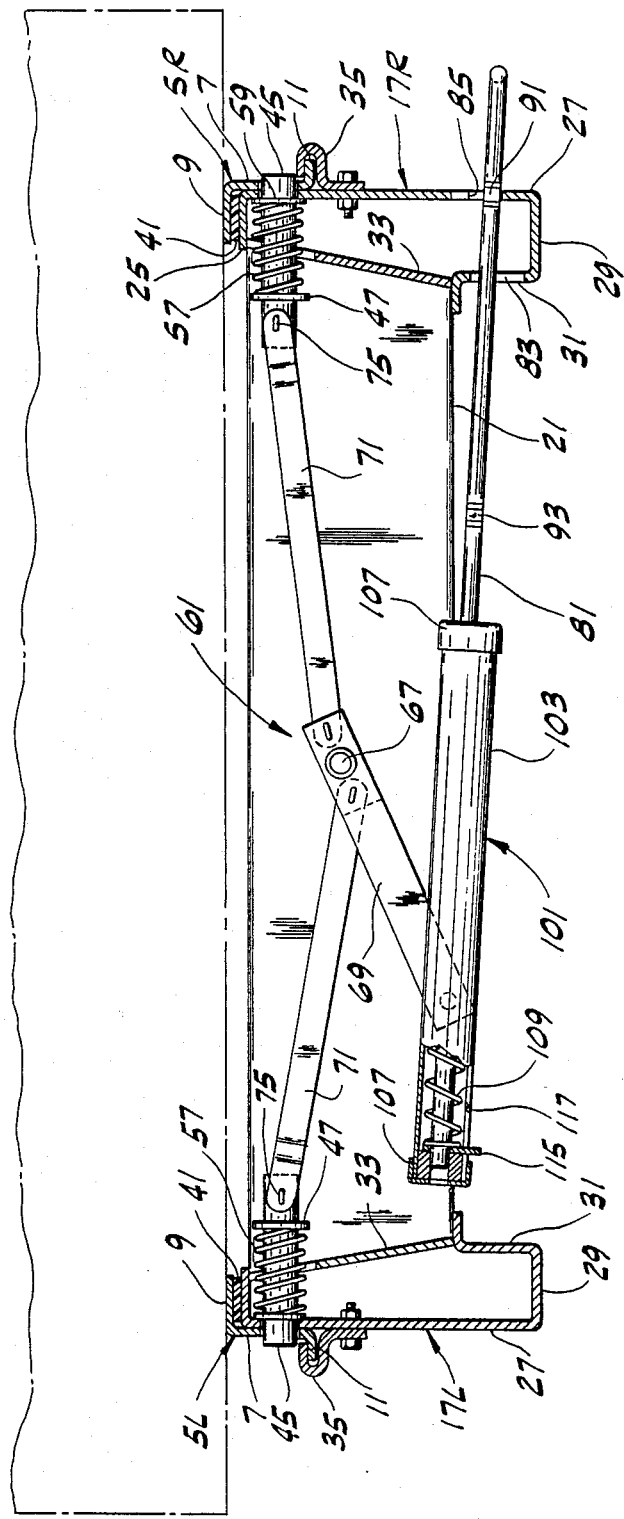
FIG. 3 is a side elevation of a spring-loaded pull rod mechanism for actuating linkage to retract locking pins to permit adjustment of the suspension of the vehicle longitudinally of the vehicle, the pull rod being shown in a first position wherein the locking pins are in extended position locking the slider in fixed position relative to the vehicle.

More particularly, the slider is of the type comprising a pair of side rails 5L, 5R secured to the bottom of the van at the left and right sides of the van in fixed position extending longitudinally of the van. Each side rail is generally Z-shaped in cross section (FIG. 3), having a generally vertical web 7, an upper inwardly-directed horizontal flange 9 and a lower outwardly-directed horizontal flange 11. The slider also includes a rectangular frame, generally designated 15, which carries the suspension and comprises left and right slide members designated 17L and 17R, respectively, and front and rear cross beams designated 19 and 21, respectively, interconnecting the slide members adjacent their ends. The slide members 17L, 17R are slidable longitudinally of the van on the side rails. As best illustrated in FIG. 3, each slide member is generally of G-shape in transverse section, having an upper inwardly-directed horizontal flange 25 spaced below the upper flange 9 of a respective side rail 5R, 5L, a generally vertical side wall 27 disposed inwardly of the web 7 of the side rail, a lower inwardly-directed horizontal flange 29, and a lip 31 bent upwardly from the inner end of the lower flange 29. An upright reinforcing gusset 33 spans the upper flange 25 and lip 31, the end result being that the each slide member is of a hollow construction. A plurality of hook-shaped sliders 35 affixed to the side walls 27 of the slide members overlie the lower flanges 11 of respective side rails 5R, 5L and permit the frame 15 of the slider carrying the suspension to be slidably adjusted relative to the side rails. Pads 41 are provided between the upper flange 25 of a slide member and the overlying upper flange 9 of a respective side rail to ensure a relatively close sliding fit between the two members. The cross beams 19, 21 of the frame span the slide members and are affixed (as by welding) to the gusset plates 33.

Figure 2:
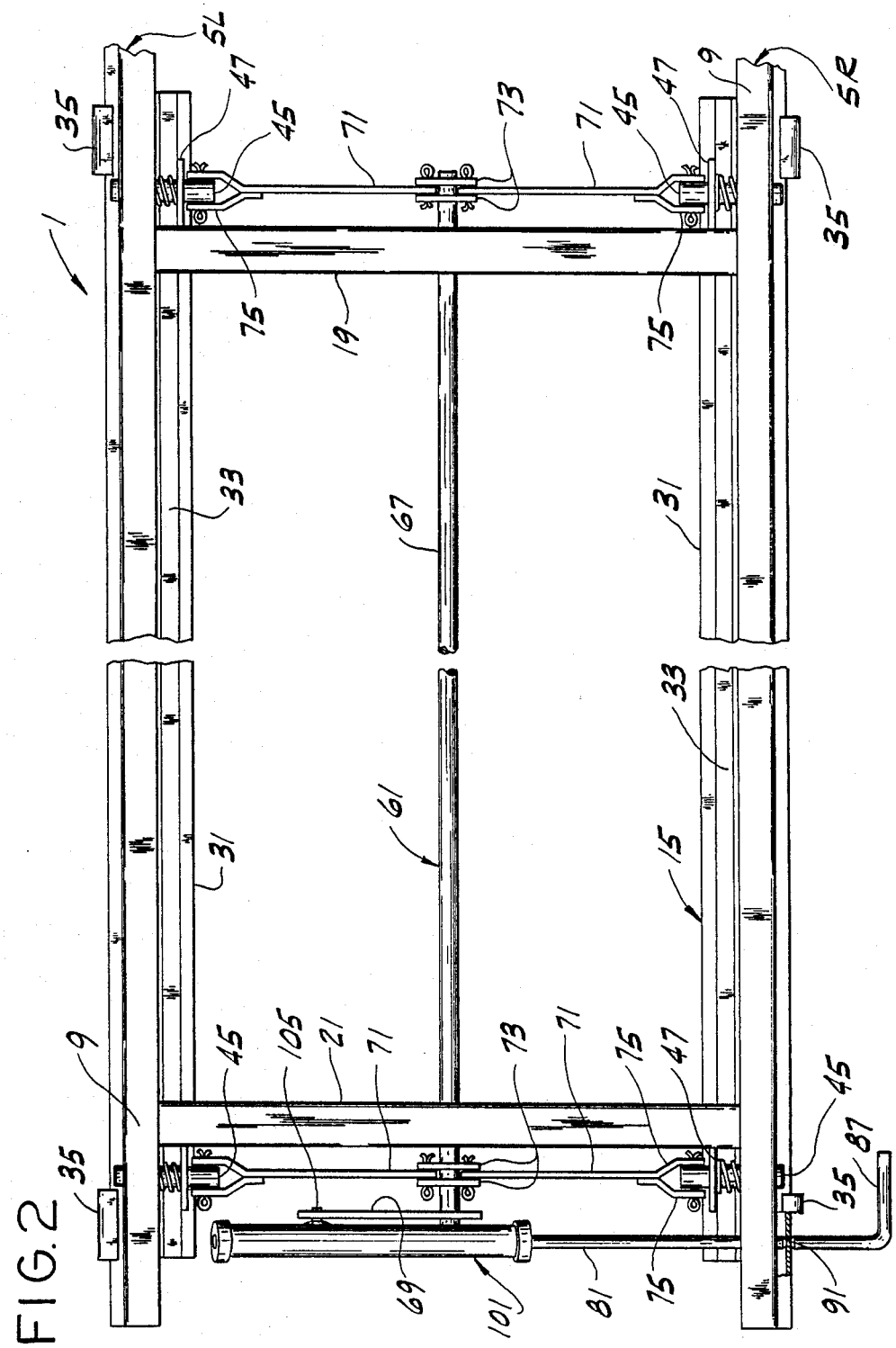
FIG. 2 is a plan view of the slider.

A plurality of locking pins, each designated 45, is provided for locking the frame 15 in various positions of adjustment relative to the side rails 5L, 5R. Four such pins 45 are illustrated in FIG. 2, two at the front of the slider 1 adjacent opposite slide members 17L, 17R and two at the rear of the slider adjacent opposite slide members. The pins are supported by mounting plates 47 affixed to the cross beams 19, 21 for horizontal linear movement in a direction generally transverse to the van and are conjointly retractible for permitting adjustment of the frame to various positions of adjustment relative to the side rails and extensible for locking the frame in a selected position of adjustment. As shown in FIG. 3, when a pin 45 is in its extended position it extends through openings 51, 53 in the gusset 33 and side wall 27 of a respective slide member 17R, 17L, and thence through one of a series of openings 55 in the web 7 of a respective side rail 5R, 5L, the openings in the side rail being spaced at regular intervals along the side rail to provide the necessary adjustment. Each pin 45 is biased toward its extended position by means of a spring 57 disposed between the mounting plate and a radial flange 59 around the pin toward its outer end.

The locking pins 45 are conjointly movable between extended and retracted positions by means of linkage generally indicated at 61 interconnecting the pins. The linkage comprises a shaft 67 extending longitudinally of the frame 15 generally parallel to the slide members 17R, 17L and midway therebetween. The shaft is journalled in the cross beams 19, 21 for rotation by means of a crank 69 at the rearward end of the shaft. A plurality of links 71, one for each locking pin 45, interconnect the shaft and the pins. Thus, as illustrated in FIGS. 2-4, the inner ends of the links 71 interconnecting the two locking pins 45 at the rear of the slider are pivotally connected to opposite ends of parallel arms 73 affixed to the shaft, and the outer ends of these links have clevis connections 75 with repective pins 45. Similarly, the inner ends of the links 71 interconnecting the two pins 45 at the front of the slider are pivotally connected to opposite ends of parallel arms 73 affixed to the shaft 67, and the outer ends of these links have clevis 75 connections with respective pins. The arrangement is such that rotation of the crank 69 in one direction effects retraction of all four locking pins 45 to the position shown in FIG. 5 and rotation of the crank in the opposite direction effects extension of the locking pins to the position shown in 3.

An actuating member in the form of a pull rod 81 is provided for rotating the crank 69 and thereby effecting articulation of the links 71 to retract the locking pins 45. The pull rod 81 extends generally transversely with respect to the van and laterally outwardly through openings 83 and 85 in the lip 31 and side wall 27 of the right slide member 17R at the rear of the frame (see FIGS. 2 and 3). The outer end of the rod is bent to form a handle 87 which may be grasped and manually pulled outwardly in the direction of the length of the rod (i.e., transversely of the van) from a first position (FIG. 3) to a second position (FIG. 5) for effecting articulation of the linkage 61 to retract the locking pins to permit adjustment of the slider and suspension relative to the side rails and van. The pull rod 81 has two sets of notches formed therein, the first set being indicated at 91 and the second set at 93. Each set comprises a pair of notches adapted for receiving edges of the side wall 27 of the slide member 17R bounding the opening therethrough, which is of a keyhole configuration (see FIG. 1). Thus, the pull rod 81 may be secured in its first and second positions by moving the pull rod to the appropriate axial position and then dropping the rod in the narrow portion of the keyhole opening so that the edges of the opening are received in a respective set of notches 91, 93.

In accordance with the present invention, the inner end portion of the pull rod 81 is axially received within a cylindric housing generally designated 101 comprising a tubular member 103 pivotally connected to the lower end of the crank 69 by means of a pin 105 on the tubular member received in an opening in the crank 69 (see FIG. 4). Opposite ends of the tubular member are sealingly closed by a pair of end caps 107, one of which has an opening therein through which the pull rod projects. A coil compression spring 109 is contained within the housing 101 and encircles the pull rod 81. The spring 109 has an outside diameter only slightly less than the inside diameter of the tubular member 103. The spring is engageable at one end with a washer 111 (constituting abutment means) on the inner end of the pull rod and at its other end with an end cap 107 of the housing. The spring 109 is so sized and configured that deflection of the spring requires a force greater than the combined forces exerted by the springs 57 urging the locking pins 45 toward their extended positions. Thus, in circumstances where the locking pins are not stuck or wedged in extended position, pulling the pull rod 81 from its first (FIG. 3) position to its second (FIG. 5) position to retract the locking pins will not deflect the spring 109 within the housing. However, if one or more of the locking pins 45 are stuck, it will be understood that the spring 109 in the housing 101 will deflect to permit movement of the pull rod laterally outwardly to the position shown in FIG. 6. The pull rod may be locked in this position while the spring 109 remains deflected thereby to maintain a force urging rotation of the crank 69 to effect articulation of the links 71 to retract the locking pins. The washer 111 on the pull rod has a radial extension 115 receivable in a slot 117 extending longitudinally of the tubular member 103 of the housing 101 (FIG. 3). This prevents rotation of the pull rod relative to the housing during deflection of the spring.

Figure 5:
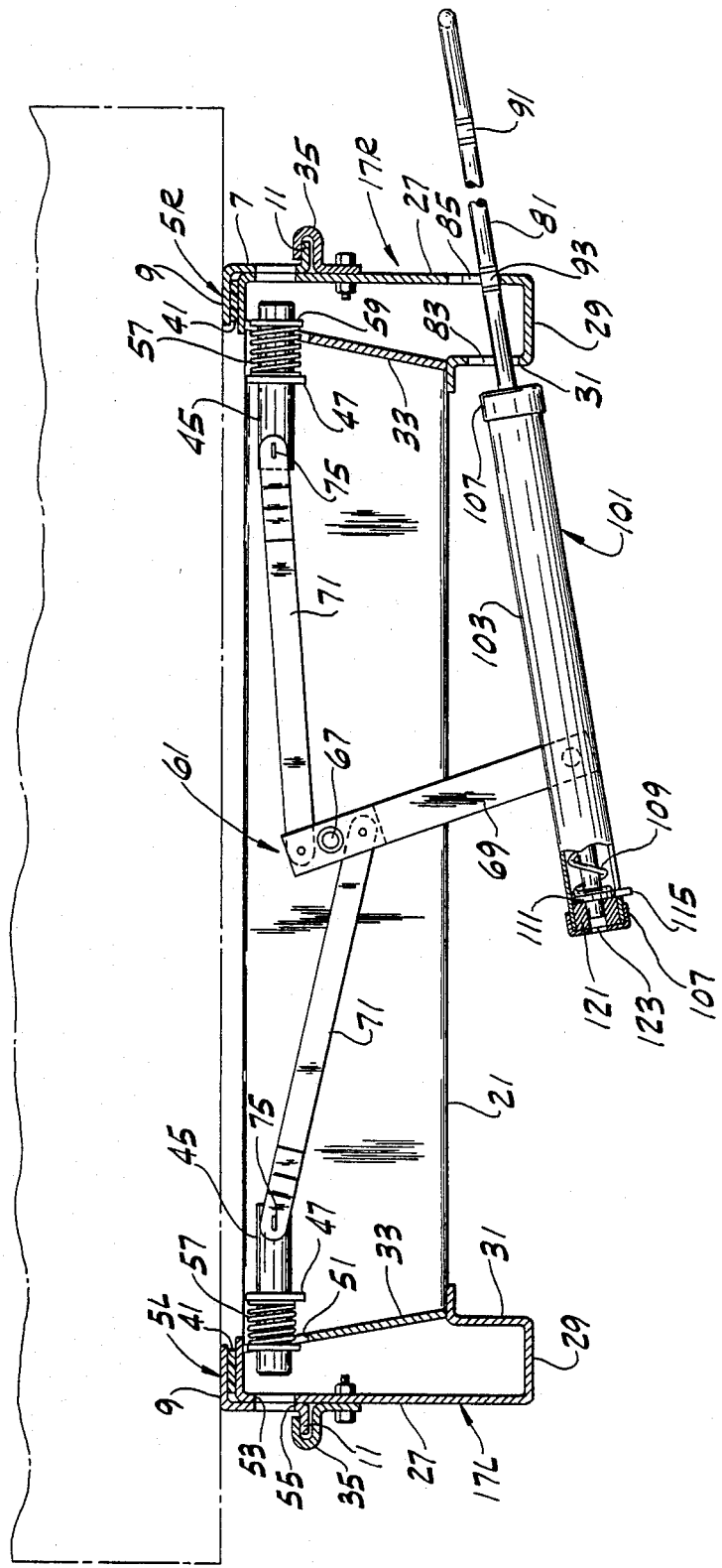
FIG. 5 is a view similar to FIG. 3 showing the pull rod in a second position wherein the locking pins are retracted.
Figure 6:
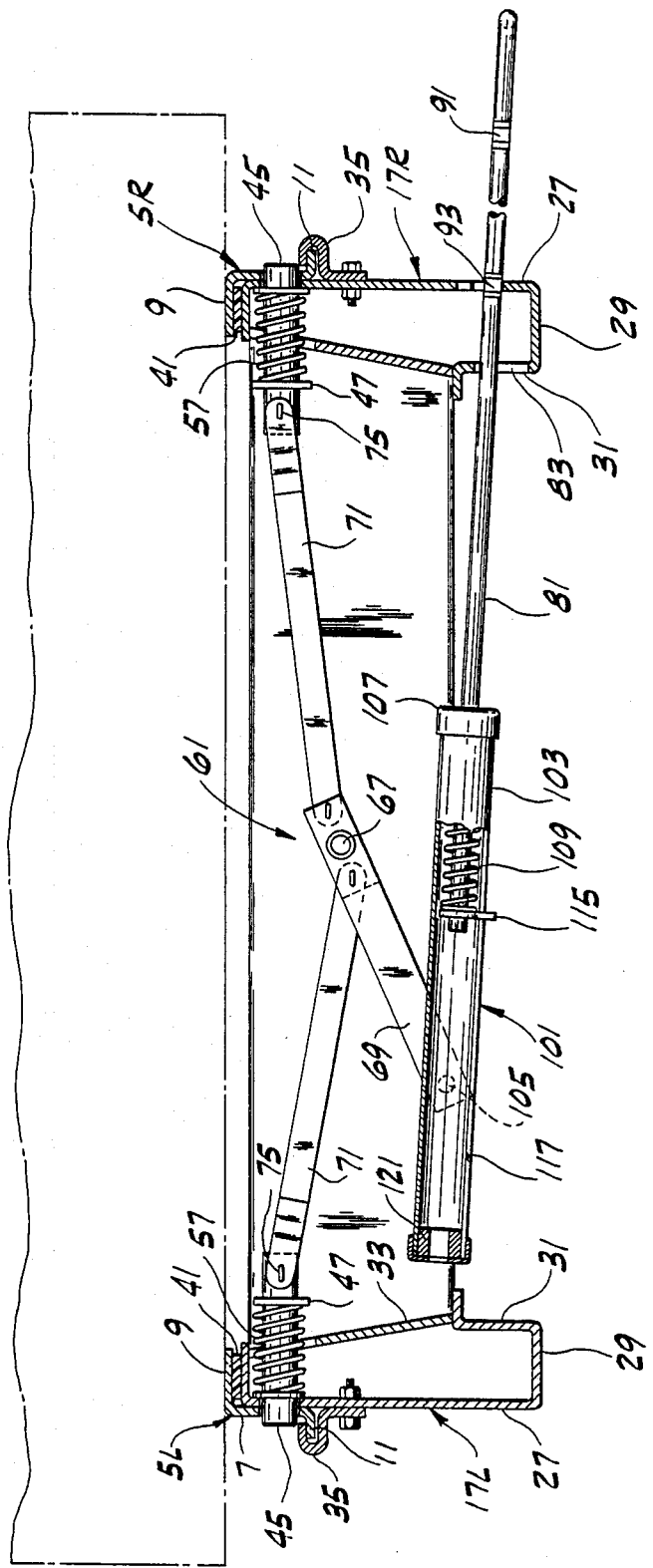
FIG. 6 is a view similar to FIG. 5 showing the pull rod in a second position wherein the locking pins are stuck in extended position.

With the pull rod 81 secured in its FIG. 6 position while the spring 109 is deflected, the vehicle may then be jogged to free the locking pins 45, whereupon the force exerted by the deflected spring in the housing 101 will be sufficient to effect movement of the housing to the right (from its FIG. 6 position to its FIG. 5 position). This in turn causes the crank 69 to rotate, thereby retracting the locking pins 45 so that the longitudinal position of the suspension relative to the van 3 may be adjusted. An annular rubber pad 121 is provided at the end of the housing 101 remote from the pull rod to cushion any impact the washer 111 might otherwise have with the end of the housing as the housing moves relative to the pull rod due to the expansion of the spring. An opening 123 in the end of the end cap 107 adjacent pad 121 provides for entry and exit of air from the cylinder as the washer 111 moves relative to the housing.

It will be apparent from the foregoing that the spring-loaded actuator rod mechanism of the present invention enables a single person to conveniently and safely adjust the suspension of his vehicle even if one or more of the locking pins 45 holding the frame 15 in fixed position happen to be stuck in extended position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A slider for adjustment of the suspension of a vehicle longitudinally with respect to the body of the vehicle, comprising a pair of side rails adapted to be secured at the left and right sides of the body in fixed position extending longitudinally of the body, and a frame adapted to carry the suspension comprising left and right slide members slidable longitudinally of the body on the side rails, and a plurality of locking pins for locking the frame in various positions of adjustment relative to the side rails, said locking pins being retractable for permitting adjustment of the frame to a selected position of adjustment and extensible for locking the frame in a selected position of adjustment, wherein the improvement comprises means for retracting said locking pins comprising linkage interconnecting said locking pins for conjoint movement of the pins between extended and retracted positions, an actuating member manually movable from a first position to a second position for effecting articulation of the linkage to retract the locking pins, spring means associated with said actuating member having a spring characteristic such that said spring means is not adapted to deflect substantially upon movement of the actuating member from said first position to said second position in the event said locking pins are not stuck in extended position but is adapted to deflect upon movement of the actuating member from said first position to said second position in the event one or more of the locking pins is stuck in extended position, said spring means, when deflected, being adapted to urge articulation of said linkage to retract said one or more stuck locking pins, and means for securing said actuating member in said second position while said spring means is deflected thereby to maintain a force urging said one or more stuck locking pins toward said retracted position for retraction of the locking pins by the spring means on movement of the vehicle to loosen the stuck pin or pins.

2. A slider as set forth in claim 1 further comprising a plurality of springs associated with said locking pins for urging said pins toward their extended positions, said spring means associated with said actuating member being so sized and configured that, when deflected, it exerts a force on said linkage sufficiently great to overcome the combined forces exerted by the springs associated with the locking pins.

3. A slider as set forth in claim 2 wherein said actuating member is in the form of an actuator rod mounted to extend generally transversely with respect to said slide members, said actuator rod having a handle at one end, constituting its outer end, adapted to be grasped and pulled outwardly to move the rod in the direction of its length from said first to said second position.

4. A slider as set forth in claim 3 wherein said spring means comprises a coil compression spring disposed in a housing connected to said linkage, said spring being adapted to be compressed upon movement of the actuator rod to said second position if one or more of said locking pins is stuck in extended position.

5. A slider as set forth in claim 4 wherein said actuator rod has an inner end portion disposed in said housing in a position in which it is encircled by said coil compression spring, and abutment means at the inner end of the actuator rod engageable with one end of the spring, said rod being movable relative to the housing to compress the spring if one or more of said locking pins are stuck in extended position when the rod is moved to its second position.

6. A slider as set forth in claim 5 wherein said spring housing comprises a cylindric member having an inside diameter only slightly greater than the outer diameter of said compression spring, and a pair of end caps sealingly closing opposite ends of the tubular member, said actuator rod extending axially of the cylinder and projecting outwardly through one of the end caps.

7. A slider as set forth in claim 6 wherein said linkage comprises a shaft extending longitudinally of the frame generally parallel to said slide members, a crank for rotating said shaft, and a plurality of links interconnecting the shaft and said locking pins whereby rotation of the crank in one direction effects retraction of the locking pins and rotation of the shaft in the opposite direction effects extension of the locking pins, said housing being connected to said crank.

8. A slider as set forth in claim 7 wherein said housing is pivotally connected to said crank.

9. A slider as set forth in claim 4 wherein said actuator rod extends laterally outwardly from said housing through an opening in one of said slide members, said means for securing said actuator rod in said second position comprising a groove in the rod adapted for receiving an edge of said opening thereby to secure the rod in fixed postion relative to said one slide member.

* * * * *